United States Patent
Kim

(10) Patent No.: US 10,671,522 B2
(45) Date of Patent: Jun. 2, 2020

(54) MEMORY CONTROLLER AND MEMORY SYSTEM INCLUDING THE SAME

(71) Applicant: SAMSUNG ELECTRONICS CO., LTD., Suwon-si (KR)

(72) Inventor: Hyun Sik Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 65 days.

(21) Appl. No.: 15/713,052

(22) Filed: Sep. 22, 2017

(65) Prior Publication Data
US 2018/0129599 A1 May 10, 2018

(30) Foreign Application Priority Data

Nov. 7, 2016 (KR) .................. 10-2016-0147462

(51) Int. Cl.
*G06F 12/10* (2016.01)
*G06F 12/02* (2006.01)
*G06F 12/0873* (2016.01)
*G06F 12/1009* (2016.01)

(52) U.S. Cl.
CPC ...... *G06F 12/0246* (2013.01); *G06F 12/0873* (2013.01); *G06F 12/1009* (2013.01); *G06F 2212/1024* (2013.01); *G06F 2212/7201* (2013.01)

(58) Field of Classification Search
CPC .......................... G06F 12/0246; G06F 12/0873
USPC ........................................................ 711/103
See application file for complete search history.

(56) References Cited

U.S. PATENT DOCUMENTS

| | | | |
|---|---|---|---|
| 7,822,940 B2 | 10/2010 | Kim et al. | |
| 7,917,689 B2 | 3/2011 | Rothman et al. | |
| 8,645,594 B2 | 2/2014 | Foong et al. | |
| 9,116,795 B2 | 8/2015 | Kim et al. | |
| 9,122,586 B2 | 9/2015 | Ma et al. | |
| 9,213,633 B2 | 12/2015 | Canepa et al. | |
| 2003/0191916 A1* | 10/2003 | McBrearty | G06F 11/1464 711/162 |
| 2010/0325374 A1* | 12/2010 | Cypher | G06F 12/0607 711/157 |
| 2014/0059278 A1 | 2/2014 | Schuh et al. | |
| 2014/0244901 A1 | 8/2014 | Panda et al. | |
| 2015/0331806 A1 | 11/2015 | Mondal et al. | |
| 2016/0026399 A1 | 1/2016 | Purkayastha et al. | |

* cited by examiner

*Primary Examiner* — Jae U Yu
(74) *Attorney, Agent, or Firm* — Sughrue Mion, PLLC

(57) ABSTRACT

A memory controller and a memory system including the same are provided. The memory controller includes a memory storing a flash translation layer (FTL) mapping table, which includes a physical page number (PPN) of a flash memory and a logical page number (LPN) corresponding to the PPN; a central processing unit (CPU) accessing a memory mapped address space to which a logical address corresponding to the LPN is allocated; and an LPN translator receiving the logical address from the CPU, extracting an LPN corresponding to the logical address, reading, from the memory, the FTL mapping table corresponding to the extracted LPN, extracting a PPN corresponding to the extracted LPN, and transmitting the extracted PPN to the CPU.

20 Claims, 9 Drawing Sheets

FIG. 6

FTL Mapping Table

| Logical Address | LPN | PPN (31 ... 27 ... 0) |
|---|---|---|
| 0x4000_0000 | 0 | PPN_0 |
| 0x4000_0001 | 1 | PPN_1 |
| 0x4000_0002 | 2 | PPN_4 |
| 0x4000_0003 | 3 | PPN_3 |
| 0x4000_0004 | 4 | PPN_2 |
| ⋮ | ⋮ | ⋮ |
| 0x7FFF_FFFF | N | PPN_N |

FTL Mapping Table

| Logical Address | LPN | FTL Map Address | PPN |
|---|---|---|---|
| 0x4000_0000 | 0 | PPN_0_ADD | |
| 0x4000_0001 | 1 | PPN_1_ADD | |
| 0x4000_0002 | 2 | PPN_2_ADD | |
| 0x4000_0003 | 3 | PPN_3_ADD | |
| ⋮ | ⋮ | ⋮ | |
| 0x7FFF_FFFF | N | PPN_N_ADD | |

MEMORY CONTROLLER AND MEMORY SYSTEM INCLUDING THE SAME

This application claims priority to Korean Patent Application No. 10-2016-0147462, filed on Nov. 7, 2016, the disclosure of which is incorporated by reference herein in its entirety.

BACKGROUND

Field

The present disclosure relates to a memory controller and a memory system including the same, and more particularly, to a flash memory-based memory controller and a memory system including the flash memory-based memory controller.

Description of the Related Art

A flash memory controller uses a flash translation layer (FTL) in order to map logical block addresses (LBAs) from a host to physical page numbers (PPNs) of a flash memory. The PPNs are addresses where the actual flash memory data exists. However, many steps are required in the mapping process and this creates a read/write latency for firmware due to firmware overhead required in performing the steps of the mapping process.

SUMMARY

Exemplary embodiments of the present disclosure provide a memory controller which allocates a portion of logical addresses of a memory mapped address space accessible by a central processing unit (CPU) to logical physical numbers (LPNs) and thus does not incur additional computation or delays when accessing the LPNs.

Exemplary embodiments of the present disclosure also provide a memory system which allocates a portion of logical addresses of a memory mapped address space accessible by a CPU to LPNs and thus does not incur additional computation or delays when accessing the LPNs.

However, exemplary embodiments of the present disclosure are not restricted to those set forth herein. The above and other exemplary embodiments of the present disclosure will become more apparent to one of ordinary skill in the art to which the present disclosure pertains by referencing the detailed description of the present disclosure given below.

According to an aspect of an exemplary embodiment, there is provided a memory controller comprising a memory storing a flash translation layer (FTL) mapping table, which includes a physical page number (PPN) of a flash memory and a logical page number (LPN) corresponding to the PPN; a central processing unit (CPU) accessing a memory mapped address space to which a logical address corresponding to the LPN is allocated; and an LPN translator receiving the logical address from the CPU, extracting an LPN corresponding to the logical address, reading, from the memory, the FTL mapping table corresponding to the extracted LPN, extracting a PPN corresponding to the extracted LPN, and transmitting the extracted PPN to the CPU.

According to another aspect of an exemplary embodiment, there is provided a memory system comprising a flash memory storing data; and a memory controller controlling the flash memory, wherein the memory controller comprises a memory, which stores a flash translation layer (FTL) mapping table including a PPN of the flash memory and an LPN corresponding to the PPN; and an LPN translator, which receives a logical address of a memory mapped address space which stores the LPN, and wherein the memory system calls the PPN of the flash memory by using a load instruction or a store instruction, and the LPN.

According to another aspect of an exemplary embodiment, there is provided a memory system comprising a host; and a storage device including a flash memory, receiving a request for data stored in the flash memory from the host, and providing the data to the host, wherein the storage device comprises a memory, which stores an flash translation layer (FTL) mapping table including a physical page number (PPN) of the flash memory and a logical page number (LPN) corresponding to the PPN; a central processing unit (CPU), which accesses a memory mapped address space to which a logical address corresponding to the LPN is allocated and performs an access operation upon request from the host by using an instruction and the logical address; and an LPN translator, which receives a logical address from the CPU, extracts an LPN corresponding to the received logical address, reads, from the memory, the FTL mapping table corresponding to the extracted LPN, and extracts a PPN corresponding to the extracted LPN.

According to another aspect of an exemplary embodiment, there is provided a memory system comprising a flash memory storing data; and a memory controller controlling the flash memory, the memory controller comprising a central processing unit (CPU); a memory mapped address space which is addressable by the CPU and stores one or more logical page numbers (LPNs) corresponding to respective physical page numbers (PPNs) of the flash memory; and an LPN translator, which receives a logical address of the memory mapped address space from the CPU, extracts an LPN corresponding to the logical address, extracts a PPN from a flash translation layer (FTL) mapping table using the extracted LPN, and transmits the extracted PPN to the CPU.

Other features and exemplary embodiments may be apparent from the following detailed description, the drawings, and the claims.

BRIEF DESCRIPTION OF THE DRAWINGS

The above and other aspects will become more apparent by describing in detail exemplary embodiments thereof with reference to the attached drawings, in which:

FIG. 6 is a table showing the relationships among logical addresses and LPNs, and an FTL mapping table in a case of an aligned access/format, which are used in a memory controller according to some exemplary embodiments of the present disclosure;

DETAILED DESCRIPTION

A flash translation layer (FTL) is software for overcoming shortcomings of a flash memory and effectively managing the flash memory. The FTL manages address mapping in units of pages. Data is transmitted to a host in units of logical block addresses (LBAs), which generally have a size of 512 B to 4 KB. However, since LBAs do not exactly correspond with, and thus cannot be one-to-one mapped to, pages of the flash memory, the flash memory may be managed by the FTL by using logical page numbers (LPNs), which each combine several sectors together. Thus, the flash memory may be programmed and read in units of the LPNs. Addresses in the flash memory where data actually exists are referred to as physical page numbers (PPNs), and the PPNs may correspond one-to-one with the LPNs.

The FTL receives an LPN from a file system and may translate the received LPN into a PPN.

The FTL has an address map table for address translation. The address map table is stored in a random access memory (RAM). The address map table shows the correspondence between logical addresses and physical addresses.

A memory controller and a memory system including the same, according to some exemplary embodiments of the present disclosure, will hereinafter be described with reference to FIGS. 1 through 12.

Figure 1:
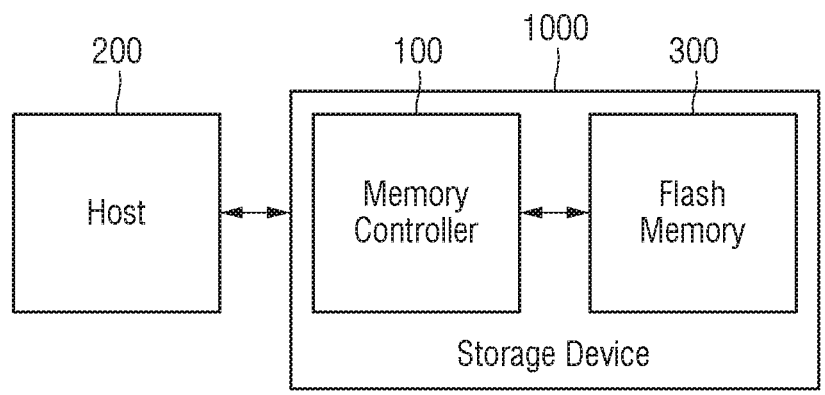
FIG. 1 is a block diagram of a memory system according to some exemplary embodiments of the present disclosure.

FIG. 1 is a block diagram of a memory system according to some exemplary embodiments of the present disclosure.

Referring to FIG. 1, the memory system includes a host 200 and a storage device 1000. The storage device 1000 includes a memory controller 100 and a flash memory 300. The host 200, the memory controller 100, and the flash memory 300 may be implemented as separate chips, modules, or devices or may be included in a single device. For example, the memory controller 100 and the flash memory 300 may be integrated into a single storage device and may then be connected to the host 200. However, the present disclosure is not limited to this example. That is, in another example, the host 200, the memory controller 100, and the flash memory 300 may be integrated into a single device.

The host 200 sends a request for a read or write operation to the memory controller 100 by using an application or a file system. The memory controller 100 controls an operation of the flash memory 300, for example, a read or write operation, in response to the request sent by the host 200.

The unit of reading data from or writing data to the flash memory 300 differs from the unit of erasing data from the flash memory 300. That is, the flash memory 300 may be erased in units of memory blocks, and may be read or written in units of pages. The flash memory 300, unlike other semiconductor memory devices, does not support an overwrite function. Thus, the flash memory 300 is erased first to be written.

The flash memory 300 includes a plurality of memory cells having a string cell structure. The plurality of memory cells are referred to as a memory cell array. The memory cell array of the flash memory 300 includes a plurality of memory blocks. Each of the memory blocks includes a plurality of pages. Each of the pages includes a plurality of memory cells that share a single wordline together. Addresses in the flash memory 300 where data actually exists are referred to as physical page numbers (PPNs).

To manage the PPNs, the memory controller 100 uses logical page numbers (LPNs), which correspond one-to-one with the PPNs. The memory controller 100 manages the LPNs and the PPNs with the use of a flash translation layer (FTL). The FTL may be stored in a memory (e.g., a memory 130 of FIG. 2 to be described in detail below) of the memory controller 100 in the form of an FTL mapping table.

More specifically, the memory controller 100 may access data in the flash memory 300 by using the FTL mapping table, which includes the LPNs and the PPNs, and this will be described later in detail.

Figure 2:
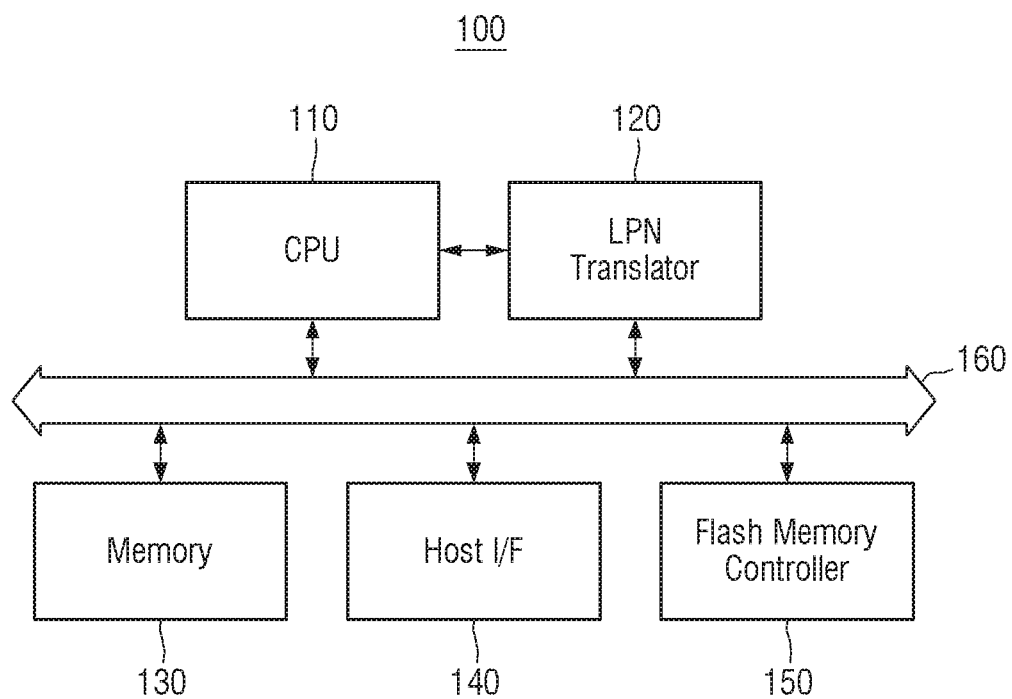
FIG. 2 is a block diagram of a memory controller according to some exemplary embodiments of the present disclosure.

FIG. 2 is a block diagram of a memory controller according to some exemplary embodiments of the present disclosure.

Referring to FIG. 2, the memory controller 100 may include a central processing unit (CPU) 110, a logical page number (LPN) translator 120, the memory 130, a host interface (I/F) 140, a flash memory controller 150, and a bus 160.

The CPU 110 may perform computation for driving the memory controller 100. The CPU 110 may call the PPNs of the flash memory 300 by using logical addresses allocated to a memory mapped address space.

In response to one of the logical addresses allocated to the memory mapped address space being received from the CPU 110, the LPN translator 120 may transmit a PPN corresponding to the received logical address to the CPU 110.

More specifically, the LPN translator 120 may extract an LPN corresponding to the received logical address, may read the FTL mapping table from the memory 130, may extract a PPN corresponding to the extracted LPN from the FTL mapping table, and may transmit the extracted PPN to the CPU 110, and this will be described later in detail.

The memory 130 may store the FTL mapping table, which includes the PPNs of the flash memory 300 and the LPNs corresponding to the PPNs, respectively, of the flash memory 300. This will be described in further detailed below with reference to FIGS. 6 and 8. The memory 130 may include a nonvolatile memory or a volatile memory. The memory 130 may be used as at least one of the operating memory of the CPU 110, a cache memory between the flash memory 300 and the host 200, and a buffer memory.

The host I/F 140 may include a protocol for exchanging data between the host 200 and the memory controller 100. For example, the host I/F 140 may be configured to communicate with the host 200 via at least one of a variety of I/F protocols such as a Universal Serial Bus (USB) protocol, a MultiMedia Card (MMC) protocol, a Peripheral Component Interconnection (PCI) protocol, a PCI-Express (PCI-E) protocol, an Advanced Technology Attachment (ATA) protocol, a serial-ATA protocol, a parallel-ATA protocol, a Small Computer Small Interface (SCSI) protocol, an Enhanced Small Disk Interface (ESDI) protocol, and an Integrated Drive Electronics (IDE) protocol, etc. These protocols are only examples, and the protocol used is not particularly limited.

The flash memory controller 150 may exchange instructions and data between the memory controller 100 and the flash memory 300 and may control the flash memory 300.

The bus 160 may be used to exchange data among the CPU 110, the LPN translator 120, the memory 130, the host I/F 140, and the flash memory controller 150. For example, the bus 600 may transmit a PPN corresponding to a called logical address to the elements of the memory controller 100. The bus 160 may include an address bus, which transmits a logical address, and a data bus, which transmits data, but the present disclosure is not limited thereto.

The bus 160 is a path via which data is transmitted. In some exemplary embodiments, the bus 600 may have a multilayer structure. The bus 600 may include a protocol for exchanging data among the CPU 110, the LPN translator 120, the memory 130, the host I/F 140, and the flash memory controller 150. A multilayer Advanced High-performance Bus (AHB) or a multilayer Advanced eXtensible Interface (AXI) may be used as the bus 600, but the present disclosure is not limited thereto.

Figure 3:
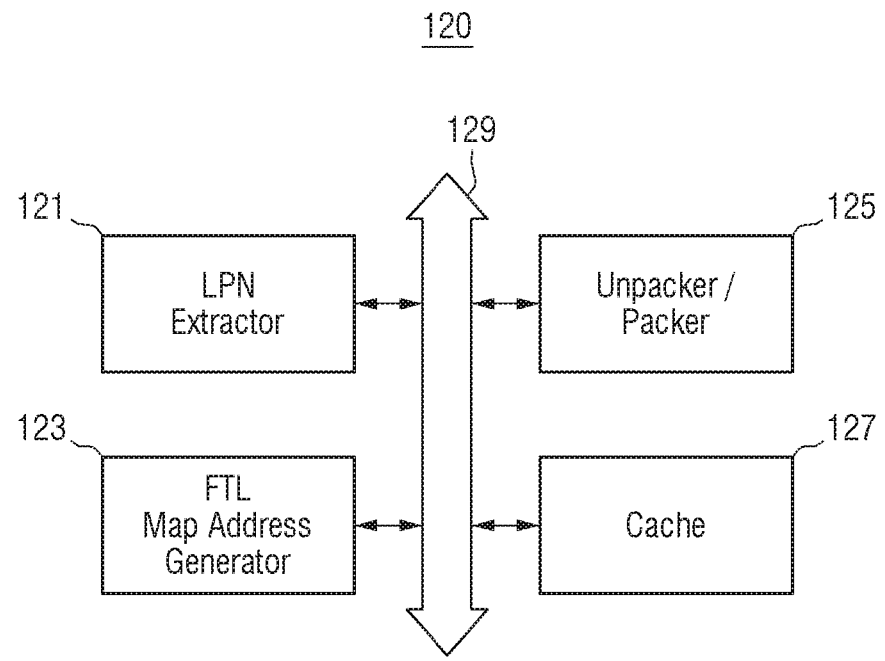
FIG. 3 is a block diagram of a logical physical number (LPN) translator of the memory controller of FIG. 2.

FIG. 3 is a block diagram of the LPN translator 120 of FIG. 2.

Referring to FIG. 3, the LPN translator 120 may include an LPN extractor 121, an FTL map address generator 123, an unpacker/packer 125, a cache 127, and a data bus 129. The LPN translator 120 may be implemented in the memory controller 100 in the form of hardware, for example by an application specific integrated circuit (ASIC) specifically created to perform the LPN translator functions or by a hardware block, but the present disclosure is not limited thereto. That is, alternatively, in some exemplary embodiments, the LPN translator 120 may operate in the memory controller 100 as a module in the form of software. The LPN translator 120 in the form of software may be implemented by at least one microprocessor operating in conjunction with one or more memories, for example by the CPU 110 operating in conjunction with memory 130.

The LPN extractor 121 may use a logical address to extract an LPN corresponding to the logical address.

The FTL map address generator 123 may generate an FTL map address via which the FTL mapping table stored in the memory 130 can be accessed, by using the extracted LPN.

The unpacker/packer 125 may receive an FTL mapping table from the memory 130 and may perform either unpacking, which is a process of extracting a PPN corresponding to the extracted LPN, or packing, which is a process of transforming an FTL mapping table including a modified PPN into a form that can be transmitted.

The cache 127 may temporarily store the FTL map address generated by the FTL map address generator 123 and/or the FTL mapping table received from the memory 130.

The data bus 129 may be used in data communication among the LPN extractor 121, the FTL map address generator 123, the unpacker/packer 125, and the cache 127. The data bus 129 may be a path via which data is transmitted and may include a protocol for exchanging data.

Figure 4:
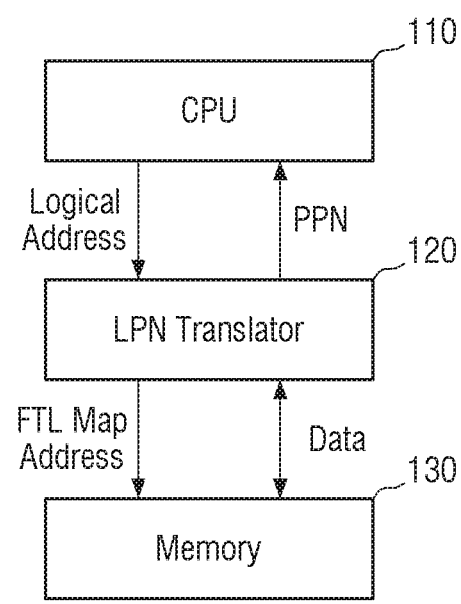
FIG. 4 is a block diagram illustrating an operation of a memory controller according to some exemplary embodiments of the present disclosure.
Figure 5:
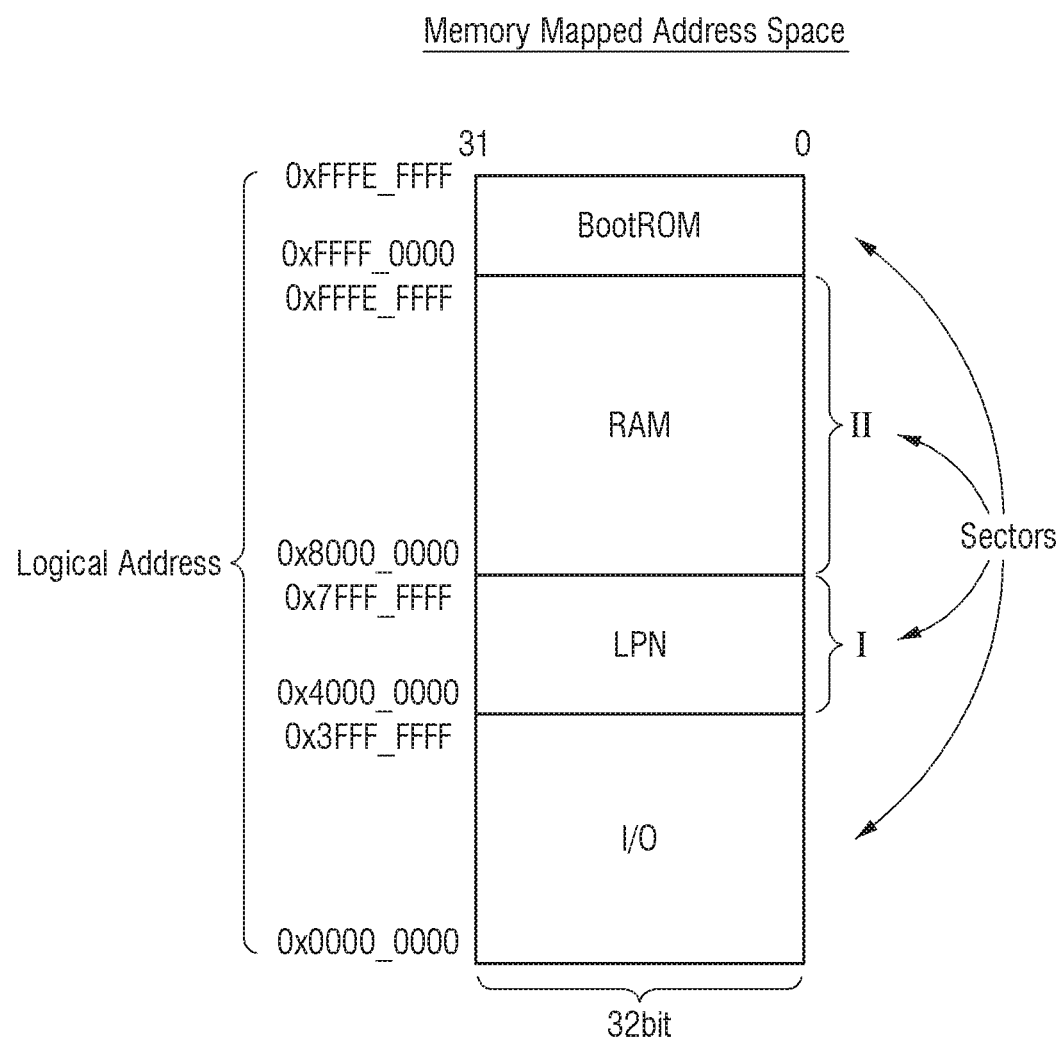
FIG. 5 is a schematic view illustrating a memory mapped address space accessible by a CPU included in a memory controller according to some exemplary embodiments of the present disclosure.

FIG. 4 is a block diagram illustrating an operation of a memory controller according to some exemplary embodiments of the present disclosure. FIG. 5 is a schematic view illustrating a memory mapped address space accessible by a CPU included in a memory controller according to some exemplary embodiments of the present disclosure. FIG. 6 is a table showing the relationships among logical addresses and LPNs, and an FTL mapping table in a case of an aligned access/format, which are used in a memory controller according to some exemplary embodiments of the present disclosure.

Referring to FIG. 4, the CPU 110 of the memory controller 100 transmits a logical address to the LPN translator 120. The logical address transmitted by the CPU 110 may be a logical address of a memory mapped address space used in the operation of the CPU 110.

More specifically, referring to FIG. 5, the logical addresses may comprise 32-bit addresses. That is, for example, the CPU 110 may use a 32-bit address system to process instructions or to perform computation, but the present disclosure is not limited thereto. In another example, the CPU 110 may use a 64- or 128-bit address system.

The logical addresses may be 32-bit long hexadecimal numbers ranging from, for example, "0x0000_0000" to "0xFFFF_FFFF". The logical addresses of the memory mapped address space may be divided into multiple sectors, and the sectors may be allocated to an input/output (I/O) device, the LPNs, a random access memory (RAM), and a read-only memory (ROM), respectively, included in the memory controller 100. The size and other details of each of the sectors may vary from one memory system to another memory system. For example, as illustrated in FIG. 5, logical addresses 0x4000_0000 through 0x7FFF_FFFF, which correspond to the LPNs, may be allocated to a first sector I of the memory mapped address space, and logical addresses 0x8000_0000 through 0xFFFF_FFFF, which are for accessing a dynamic random access memory (DRAM), may be allocated to a second sector II of the memory mapped address. FIG. 5 shows logical addresses 0x4000_0000 through 0x7FFF_FFFF, which correspond to the LPNs, are allocated to a first sector I. However, this is only an example, and the logical addresses 0x4000_0000 through 0x7FFF_FFFF may be allocated to multiple sectors in some exemplary embodiments. Additionally, the logical addresses illustrated in FIG. 5 as corresponding to the LPNs may be of a different range. For example, in other exemplary embodiments, the logical addresses 0x2000_0000 to 0x8FFF_FFFF may correspond to the LPNs.

For example, in response to the DRAM being accessed, the logical addresses 0x8000_0000 through 0xFFFF_FFFF, which are allocated to the second sector II, are used, and in response to the LPNs of the flash memory 300 being accessed, the logical addresses 0x4000_0000 through 0x7FFF_FFFF, which are allocated to the first sector I, may be used. However, the present disclosure is not limited to this example.

The CPU 110 allocates the logical addresses corresponding to the LPNs directly to a portion of the memory mapped address space. Thus, the CPU 110 is able to access the LPNs directly by addressing the logical addresses of the memory mapped address space. If the logical addresses corresponding to the LPNs are allocated directly to the memory mapped address space, data may be read from, or written to, the LPNs simply by one instruction without additional computation and/or without any additional delay. For example, referring for a moment to the example shown in FIG. 6, the CPU may read LPN0 by reading logical address 0x4000_0000, and may read LPN1 by reading logical address 0x4000_0001.

That is, the CPU 110 may call the PPNs by using the logical addresses that correspond to the LPNs in a similar manner to using addresses allocated to a particular device (for example, a DRAM) to access the particular device. Thus, the memory controller 100 may avoid the firmware overhead necessary for calling the LPNs, thereby reducing operation delays and improving performance.

Referring to FIG. 6, the logical addresses allocated to a portion of the memory mapped address space for the LPNs may correspond one-to-one with the LPNs. Since the LPNs also correspond one-to-one with the PPNs, the logical addresses allocated to the memory mapped address space may also correspond one-to-one with the PPNs.

The flash memory 300 may include firmware (F/W), which stores a load instruction and a store instruction. The CPU 110 may call the load instruction or the store instruction from the F/W of the flash memory 300 and may store the called instruction in the RAM of the CPU 110. Various instructions of the F/W may be written in assembly language, and F/W code performing a specific operation may be created by a combination of the various instructions.

The CPU 110 may access the flash memory 300 by using the load instruction or the store instruction, and logical addresses.

That is, the CPU 110 may call the PPNs of the flash memory 300 by using a load instruction or a store instruction, along with logical addresses.

For example, in a case in which the CPU 100 executes an instruction "LRD R0, [0x4000_0000]", the CPU 110 may transmit a logical address "0x4000_0000" directly to the LPN translator 120 and may thus call a PPN corresponding to an LPN "0", for example, PPN0 in the example shown in FIG. 6. Referring to the instruction "LRD R0, [0x4000_0000]", "LRD" represents a load instruction, and "R0" is a variable. Thus, in response to the instruction "LRD R0, [0x4000_0000]" data from PPN0 would be loaded into/as R0.

Similarly, in a case in which the CPU 100 executes an instruction "STR R0, [0x4000_0004]", the CPU 110 may transmit a logical address "0x4000_0004" directly to the LPN translator 120 and may thus call a PPN corresponding to an LPN "4", for example, PPN2 in the sample shown in FIG. 6. Referring to the instruction "STR R0, [0x4000_0004]", "STR" represents a store instruction, and "R0" is a variable. Thus, in response to the instruction "STR R0, [0x4000_0004]" data from R0 would be stored in PPN2.

That is, the memory controller 100 may allocate LPNs to logical addresses of the memory mapped address space and may thus be able to directly call the LPNs simply with instructions including the logical addresses. Accordingly, the size of an instruction for calling a desired LPN may be reduced, and firmware overhead for searching the LPNs may be avoided, thereby reducing delays and improving performance.

Referring again to FIG. 4, the LPN translator 120 receives a logical address from the CPU 110, extracts an LPN corresponding to the received logical address, and extracts an FTL map address corresponding to the extracted LPN.

Thereafter, the LPN translator 120 transmits the extracted FTL map address to the memory 130 and receives data including an FTL mapping table corresponding to the extracted FTL map address from the memory 130.

Thereafter, the LPN translator 120 extracts a PPN from the FTL mapping table included in the received data and transmits the extracted PPN to the CPU 110.

An operation of the LPN translator 120 will hereinafter be described with reference to FIG. 7.

Figure 7:
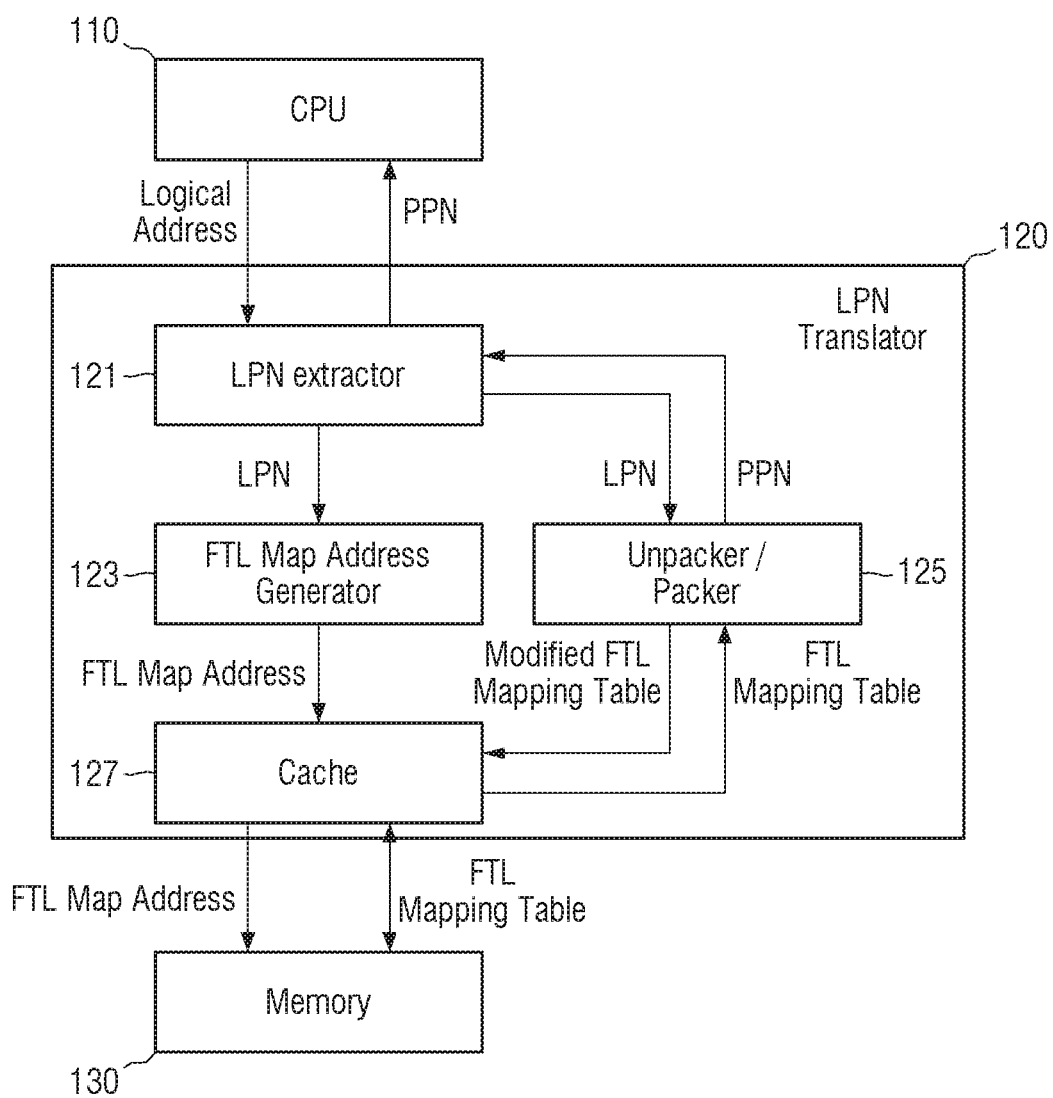
FIG. 7 is a block diagram illustrating an operation of an LPN translator according to some exemplary embodiments of the present disclosure.
Figures 8, 9:
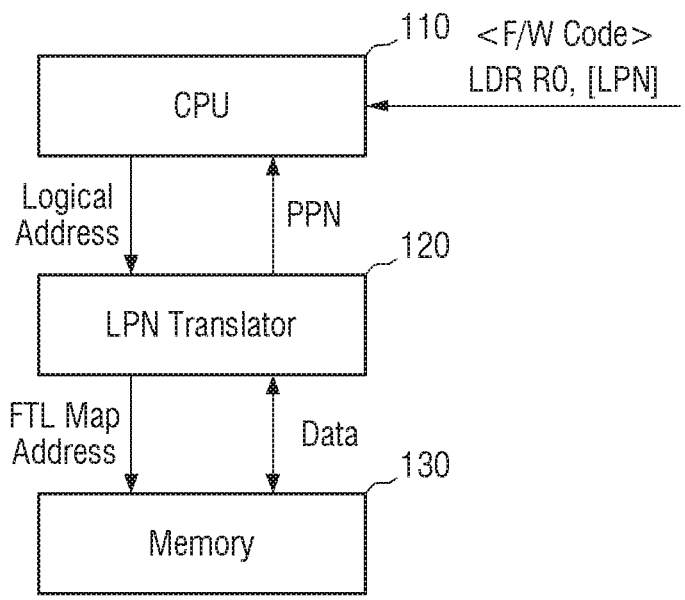
FIG. 8 is a table showing the relationships among logical addresses, LPNs, and flash translation layer (FTL) map addresses, and an FTL mapping table in a case of an unaligned format/access, which are used in an LPN translator according to some exemplary embodiments of the present disclosure.
FIG. 9 is a block diagram illustrating an operation of a memory controller according to some exemplary embodiments of the present disclosure in accordance with a load instruction.

FIG. 7 is a block diagram illustrating an operation of an LPN translator according to some exemplary embodiments of the present disclosure. FIG. 8 is a table showing the relationships among logical addresses, LPNs, and flash translation layer (FTL) map addresses, and an FTL mapping table in a case of an unaligned format/access, which are used in an LPN translator according to some exemplary embodiments of the present disclosure.

Referring to FIG. 7, the LPN extractor 121 of the LPN translator 120 may receive a logical address from the CPU 110. The received logical address may include of an address of a portion of the memory mapped address space of the CPU 110.

The LPN extractor 121 may extract an LPN corresponding to the received logical address. For example, in a case in which the received logical address is "0x4000_0000", an LPN "0" may be extracted, and in a case in which the received logical address is "0x4000_0001", an LPN "1" may be extracted in the example shown in FIG. 6. However, the present disclosure is not limited to this example. The LPN extractor 121 may transmit the extracted LPN to the FTL map address generator 123 and the unpacker/packer 125.

The FTL map address generator 123 may calculate an FTL map address via which the FTL mapping table stored in the memory 130 can be accessed, by using the extracted LPN.

More specifically, referring to FIG. 8, the FTL mapping table may include information regarding the LPNs and the PPNs. In the FTL mapping table, the PPNs may be sequentially connected to one another. The unit size of the PPNs may differ from a unit size that can be processed by the CPU 110. The unit size of the PPNs may vary depending on the storage capacity of the flash memory 300.

For example, the unit size of the PPNs may be 28 bits, and the unit size that can be processed by the CPU 110 may be 32 bits. The CPU 110 or the LPN translator 120 may read the FTL mapping table in the order of first, second, and third lines L1, L2, and L3. In this case, since the unit size of the PPNs may differ from the unit size that can be processed by the CPU 110, a whole first PPN (e.g., PPN_0 in FIG. 8) and a part of a second PPN (e.g., PPN_1 in FIG. 8) may be included in the first line L1, the rest of the second PPN PPN_1 and a part of a third PPN (e.g., PPN_2) may be included in the second line L2, and the rest of the third PPN (e.g., PPN_2) and a fourth PPN (e.g., PPN_3) may be included in the third line L3, etc. Thus, the PPNs in the FTL mapping table are in an unaligned format/access. In other words, the format of the PPNs in the FTL mapping table of FIG. 8 is unaligned with the unit size that can be processed/accessed by the CPU 110. By contrast, in the example shown in FIG. 6, a unit size of the PPNs may be 32 bits, which is aligned with the format that can be processed/accessed by the CPU 110. In other words, the PPNs in FIG. 6 are not sequentially connected to one another as shown in FIG. 8.

Thus, to properly read the PPNs corresponding to the LPNs, respectively, FTL map addresses (e.g., a line and bit number within the line) corresponding to the PPNs, respectively, are used. The PPNs may correspond one-to-one with the FTL map addresses.

The FTL map address generator 123 may calculate the FTL map address corresponding to the extracted LPN. The calculated FTL map address may be transmitted to the cache 127.

Referring again to FIG. 7, the cache 127 may access the memory 130 by using the calculated FTL map address provided by the FTL map address generator 123, may receive the FTL mapping table corresponding to the calculated FTL map address from the memory 130, and may transmit the received FTL mapping table to the unpacker/packer 125, but the present disclosure is not limited thereto. Although not specifically illustrated, the cache 127 may be omitted in some exemplary embodiments, in which case, the function of the cache 127 of exchanging data with the memory 130 may be performed by a memory I/F.

The unpacker/packer 125 may receive the FTL mapping table corresponding to the calculated FTL map address from the memory 130. The unpacker/packer 125 may perform unpacking, i.e., extract a PPN corresponding to the extracted LPN from the received FTL mapping table.

In a case in which the extracted PPN is modified (e.g., the data is changed), the unpacker/packer 125 generates a new FTL mapping table including the modified PPN. Thereafter, the unpacker/packer 125 packs the new FTL mapping table into the unit size that can be processed by the CPU 110 and transmits the packed new FTL mapping table through the cache 127 to the memory 130. In some exemplary embodiments, the unpacker/packer 125 may transmit the new FTL mapping table directly to the memory 130. Then, the memory 130 updates the existing FTL mapping table with the new FTL mapping table including the modified PPN.

In a case in which the CPU 110 reads the FTL mapping table, the loaded FTL mapping table may be in an unaligned state, as illustrated in FIG. 8, because of the difference between the unit size of the PPNs and the unit size that can be processed by the CPU 110. The unpacker/packer 125 may extract the PPNs from the FTL mapping table in the unaligned state through unpacking.

In a case in which the PPNs are modified, the unpacker/packer 125 may pack the modified PPNs into the unit size that can be processed by the CPU 110 and may transmit the packed PPNs to the memory 130. For example, FIG. 8 shows a packed FTL mapping table. Then, the memory 130 may update the existing FTL mapping table with the packed PPNs.

The cache 127 may temporarily store data exchanged with the memory 130 and addresses. More specifically, the cache 127 may temporarily store the FTL map address generated by the FTL map address generator 123 and the FTL mapping table received from the memory 130.

In a case in which the CPU 110 calls the same LPN more than once, the cache 127 may transmit the FTL mapping table stored in the cache 127 to the unpacker/packer 125, instead of accessing the memory 130. That is, if the FTL map address temporarily stored in the cache 127 matches a newly-received FTL map address, i.e., if a cache hit occurs, the access to the memory 130 may be omitted and the FTL may be read from the cache 127. As a result, any delays that may be caused by accessing the memory 130 may be reduced, and the operating speed of the memory controller 100 may be improved.

The cache 127 may load, in advance, the FTL mapping table stored in the memory 130 through a preload function and may temporarily store the loaded FTL mapping table. In a case in which the CPU 110 calls the FTL map address stored in the cache 127, the cache 127 may readily provide the FTL mapping table stored therein. As a result, the amount of time that it takes to access the memory 130 may be reduced, and the operating speed of the memory 130 may be improved.

In some exemplary embodiments, the LPN translator 120 may omit the cache 127, in which case, the FTL map address generator 123 may transmit an FTL map address directly to the memory 130 and the unpacker/packer 125 may receive data of the FTL mapping table directly from the memory 130. However, the present disclosure is not limited to this.

Figure 10:
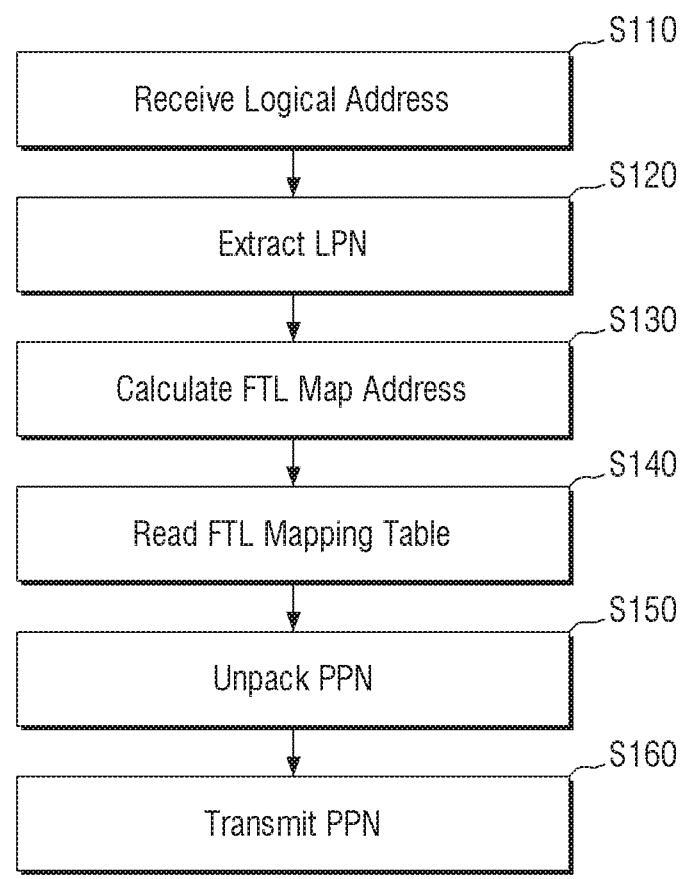
FIG. 10 is a flowchart illustrating an operation of a memory controller according to some exemplary embodiments of the present disclosure in accordance with a load instruction.

FIG. 9 is a block diagram illustrating an operation of a memory controller according to some exemplary embodiments of the present disclosure in accordance with a load instruction. FIG. 10 is a flowchart illustrating an operation of a memory controller according to some exemplary embodiments of the present disclosure in accordance with a load instruction. The exemplary embodiment of FIGS. 9 and 10 will hereinafter be described, focusing mainly on differences with the exemplary embodiment of FIGS. 7 and 8 to avoid any redundant descriptions.

Referring to FIGS. 9 and 10, the CPU 110 of the memory controller 100 may perform an access operation using a load instruction LDR and a logical address. Although not specifically illustrated, the load instruction LDR may be received from the firmware (F/W) of the flash memory 300 and may be stored in the internal memory (such as, for example, a RAM or a ROM) of the CPU 110. Alternatively, the load instruction LDR may be already stored in the internal memory (such as, for example, a RAM or a ROM) of the CPU 110.

In a case in which an external device (for example, the host 200) sends a request for reading data stored in the flash memory 300, the CPU 110 may execute an access instruction, which is the combination of the load instruction LDR and a logical address. The access instruction may be, for example, "LRD R0, [LPN]" where "LRD" represents the load instruction, "R0" is a variable, and "[LPN]" represents a logical address allocated to the memory mapped address space. The access instruction may be configured in assembly language.

In a case in which the access instruction is executed, the CPU 110 transmits the logical address included in the access instruction to the LPN translator 120.

Then, the FTL map address generator 123 receives the logical address transmitted by the CPU 110 (S110).

Thereafter, the LPN extractor 121 extracts an LPN by using the received logical address (S120). The LPN extractor 121 transmits the extracted LPN to the FTL map address generator 123.

Thereafter, the FTL map address generator 123 calculates an FTL map address (S130). The FTL map address is an address via which the FTL mapping table stored in the memory 130 can be accessed. The FTL map address may be calculated by using the extracted LPN. The FTL map address generator 123 transmits the calculated FTL map address to the cache 127.

Thereafter, the cache 127 reads the FTL mapping table corresponding to the calculated FTL map address from the memory 130 (S140). The cache 127 transmits the read FTL mapping table to the unpacker/packer 125.

Thereafter, the unpacker/packer 125 unpacks the PPN (S150). That is, the unpacker/packer 125 performs unpacking, i.e., extracts a PPN corresponding to the extracted LPN). The unpack/pack unit 125 transmits the extracted PPN to the LPN extractor 121.

Thereafter, the LPN extractor 121 receives the extracted PPN from the unpacker/packer 125 and transmits the received PPN to the CPU 110 (S160). However, the present disclosure is not limited thereto. That is, in some exemplary embodiments, the unpacker/packer 125 may transmit the extracted PPN directly to the CPU 110.

Figure 11:
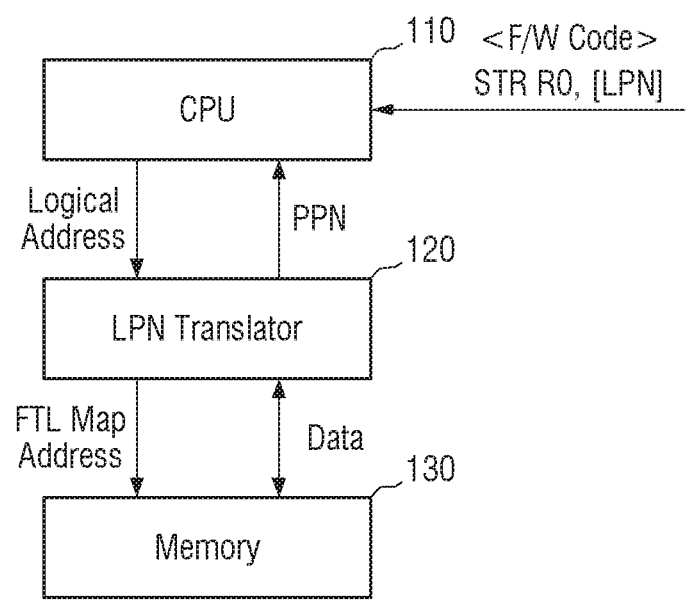
FIG. 11 is a block diagram illustrating an operation of a memory controller according to some exemplary embodiments of the present disclosure in accordance with a store instruction.
Figure 12:
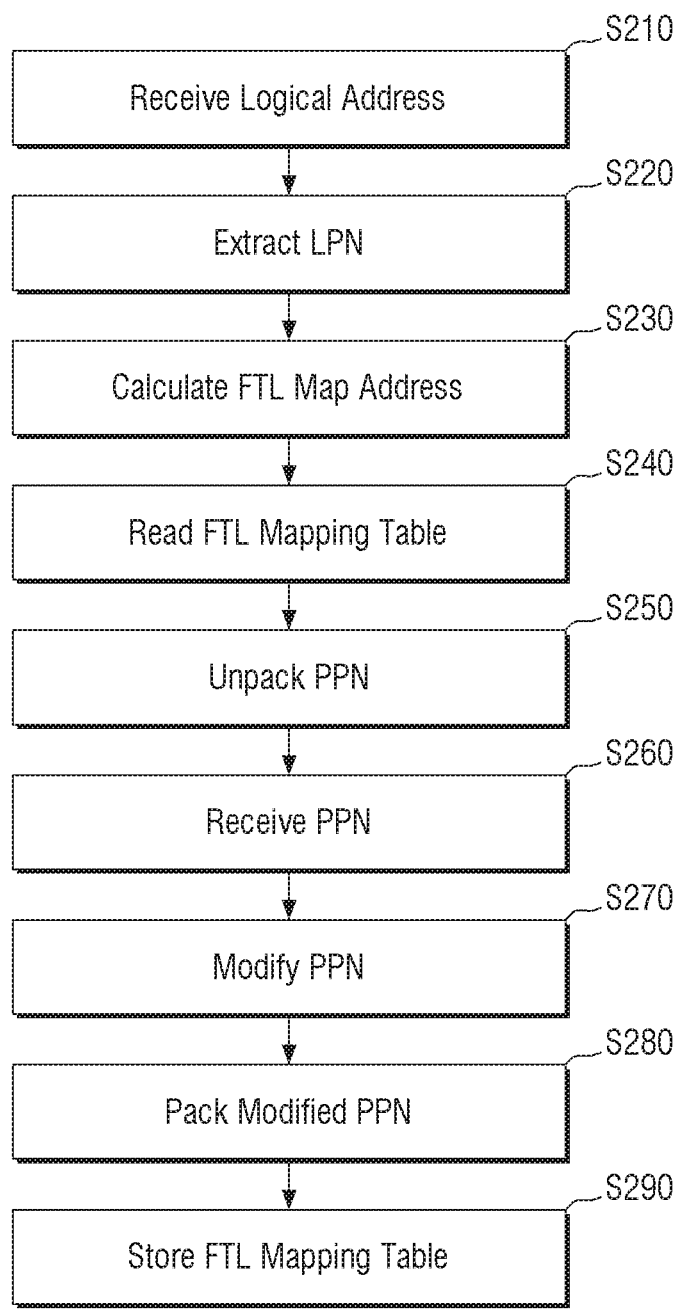
FIG. 12 is a flowchart illustrating an operation of a memory controller according to some exemplary embodiments of the present disclosure in accordance with a store instruction.

FIG. 11 is a block diagram illustrating an operation of a memory controller according to some exemplary embodiments of the present disclosure in accordance with a store instruction. FIG. 12 is a flowchart illustrating an operation of a memory controller according to some exemplary embodiments of the present disclosure in accordance with a store instruction. The exemplary embodiment of FIGS. 11 and 12 will hereinafter be described, focusing mainly on differences with the exemplary embodiment of FIGS. 9 and 10 to avoid any redundant descriptions.

Referring to FIGS. 11 and 12, the CPU 110 of the memory controller 100 may perform an access operation using a store instruction STR and a logical address. Although not specifically illustrated, the store instruction STR may be received from the F/W of the flash memory 300 and may be stored in the internal memory (such as, for example, a RAM or a ROM) of the CPU 110. Alternatively, the store instruction STR may be already stored in the internal memory (such as, for example, a RAM or a ROM) of the CPU 110.

For example, in a case in which an external device (for example, the host 200) sends a request for modifying data stored in the flash memory 300, the CPU 110 may execute an access instruction, which is the combination of the store instruction STR and a logical address. The access instruction may be, for example, "STD R0, [LPN]" where "STD" represents the store instruction, "R0" is a variable, and "[LPN]" represents a logical address allocated to the memory mapped address space. The access instruction may be configured in assembly language.

In a case in which the access instruction is executed, the CPU 110 transmits the logical address included in the access instruction to the LPN translator 120.

S210, S220, S230, S240, and S250 of FIG. 12 may be substantially the same as S110, S120, S130, S140, and S150, respectively, of FIG. 10, and thus, detailed descriptions thereof will be omitted. The operation of the LPN translator 120 that follows S250 will hereinafter be described.

The LPN extractor 121 receives a PPN from the unpacker/packer 125 (S260).

Thereafter, the LPN extractor 121 modifies the PPN (S270). The LPN extractor 121 may update the received PPN with a new PPN. The LPN extractor 121 transmits the updated PPN to the unpacker/packer 125. However, the present disclosure is not limited to this. That is, operation S270 may be performed by the unpacker/packer 125.

Thereafter, the unpacker/packer 125 packs the modified PPN (S280). The unpacker/packer 125 may perform packing, i.e., may generate a new FTL mapping table including the modified PPN. The new FTL mapping table includes the modified PPN, and in the new FTL mapping table, the modified PPN and other PPNs may be sequentially connected to one another. The new FTL mapping table may be transmitted to the cache 127.

Thereafter, the cache 127 stores the new FTL mapping table in the memory 130 (S290). As a result, the existing FTL mapping table stored in the memory 130 may be updated in accordance with the store instruction STR.

Although not specifically illustrated, the storage device 1000 of FIG. 1 may be mounted using various types of packages. For example, the flash memory 300 and/or the memory controller 100 may be mounted using packages such as a Package on Package (PoP), Ball grid array (BGA), Chip scale package (CSP), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Thin Quad FlatPack (TQFP), Small Outline (SOIC), Shrink Small Outline Package (SSOP), Thin Small Outline (TSOP), Thin Quad FlatPack (TQFP), System In Package (SIP), Multi Chip Package (MCP), Wafer-level Fabricated Package (WFP), and Wafer-Level Processed Stack Package (WSP), but the present disclosure is not limited thereto.

While the present inventive concept has been particularly shown and described with reference to exemplary embodiments thereof, it will be understood by those of ordinary skill in the art that various changes in form and details may be made therein without departing from the spirit and scope of the present inventive concept as defined by the following claims. It is therefore desired that the present embodiments be considered in all respects as illustrative and not restrictive, reference being made to the appended claims rather than the foregoing description to indicate the scope of the claimed invention.

What is claimed is:

1. A memory controller comprising:
   a memory storing a flash translation layer (FTL) mapping table, which includes a correspondence between physical page numbers (PPNs) of a flash memory and logical page numbers (LPNs) corresponding to the PPNs;
   a central processing unit (CPU) that accesses a LPN directly by addressing a logical address of a memory mapped address space, logical addresses corresponding to the LPNs being allocated directly to a portion of the memory mapped address space; and
   an LPN translator that receives the logical address from the CPU, extracts an LPN corresponding to the logical address, reads the FTL mapping table corresponding to the extracted LPN from the memory, extracts a PPN corresponding to the extracted LPN based on the correspondence in the FTL mapping table, and transmits the extracted PPN to the CPU,
   wherein the memory mapped address space is different from the FTL mapping table in the memory.

2. The memory controller of claim 1, wherein the LPN translator comprises:
   an LPN extractor, which extracts the LPN corresponding to the received logical address;
   an FTL map address generator, which generates an FTL map address via which the FTL mapping table stored in the memory is accessed, by using the extracted LPN; and
   an unpacker/packer, which receives the FTL mapping table corresponding to the generated FTL map address from the memory, and in a case in which the correspondence is an aligned format extracts the PPN and in a case in which the correspondence is an unaligned format, unpacks the PPN and extracts the PPN, based on the correspondence in the FTL mapping table.

3. The memory controller of claim 2, further comprising:
   a cache temporarily storing the FTL map address generated by the FTL map address generator and the FTL mapping table received from the memory.

4. The memory controller of claim 3, wherein in response to a same logical address being received more than once, the LPN translator provides the PPN of a subsequently received logical address by using the FTL mapping table stored in the cache.

5. The memory controller of claim 2, wherein in response to the PPN being modified, the unpacker/packer generates a new FTL mapping table by packing the modified PPN.

6. The memory controller of claim 1, wherein the memory mapped address space includes a first sector to which the logical addresses corresponding to the LPNs are directly allocated and a second sector to which logical addresses for accessing a dynamic random access memory (DRAM) included in the memory controller are allocated.

7. The memory controller of claim 6, wherein
in response to the DRAM being accessed, the logical addresses allocated to the second sector are used, and
in response to the flash memory being accessed, the logical addresses allocated to the first sector are used.

8. The memory controller of claim 1, wherein the LPNs correspond one-to-one with the PPNs of the flash memory.

9. The memory controller of claim 1, wherein a load instruction or a store instruction are used along with the logical address to perform an access operation for calling the PPN of the flash memory.

10. A memory system comprising:
a flash memory storing data; and
a memory controller controlling the flash memory,
wherein the memory controller comprises:
    a memory, which stores a flash translation layer (FTL) mapping table including a correspondence between physical page numbers (PPNs) of the flash memory and logical page numbers (LPNs) corresponding to the PPNs; and
    an LPN translator, which receives a logical address from a central processing unit (CPU) which accesses a LPN directly by addressing the logical address of a memory mapped address space, logical addresses corresponding to the LPNs being allocated directly to a portion of the memory mapped address space, extracts an LPN corresponding to the logical address, reads the FTL mapping table corresponding to the logical address, extracts a PPN corresponding to the extracted LPN based on the correspondence in the FTL mapping table, and transmits the extracted PPN to the CPU,
wherein the memory system calls the PPN of the flash memory by using a load instruction or a store instruction, and the LPN, and
wherein the memory mapped address space is different from the FTL mapping table in the memory.

11. The memory system of claim 10, wherein
the flash memory includes firmware, which includes the load instruction or the store instruction, and
the CPU loads the load instruction or the store instruction from the flash memory and performs an access operation by using the logical address.

12. The memory system of claim 11, wherein an access instruction for the access operation is configured in assembly language and is stored in a memory included in the CPU or is stored in the firmware.

13. The memory system of claim 11, wherein the CPU transmits the logical address directly to the LPN translator and receives the PPN from the LPN translator.

14. The memory system of claim 10, wherein the logical address corresponds one-to-one with the PPN of the flash memory.

15. The memory system of claim 10, wherein a unit size of the LPN is the same as a unit size of a memory mapped address of the memory mapped address space.

16. A memory system, comprising:
a host; and
a storage device including a flash memory, receiving a request for data stored in the flash memory from the host, and providing the data to the host,
wherein the storage device comprises:
    a memory, which stores a flash translation layer (FTL) mapping table including a correspondence between physical page numbers (PPNs) of the flash memory and logical page numbers (LPNs) corresponding to the PPNs;
    a central processing unit (CPU), which accesses an LPN directly by addressing a logical address of a memory mapped address space, logical addresses corresponding to the LPNs being allocated directly to a portion of the memory mapped address space, and upon receiving the request from the host, performs an access operation by using an instruction and the logical address; and
    an LPN translator, which receives the logical address from the CPU, extracts an LPN corresponding to the received logical address, reads the FTL mapping table corresponding to the extracted LPN from the memory, and extracts a PPN corresponding to the extracted LPN based on the correspondence in the FTL mapping table,
wherein the memory mapped address space is different from the FTL mapping table in the memory.

17. The memory system of claim 16, wherein the instruction used in the access operation is a load instruction or a store instruction, and is combined with the logical address.

18. The memory system of claim 16, wherein the LPN translator comprises:
an LPN extractor, which extracts the LPN corresponding to the logical address received from the CPU;
an FTL map address generator, which generates an FTL map address via which the FTL mapping table stored in the memory is accessed, by using the extracted LPN; and
an unpacker/packer, which receives the FTL mapping table corresponding to the generated FTL map address from the memory and, in a case in which the correspondence is an aligned format, extracts the PPN and in a case in which the correspondence is an unaligned format, unpacks the PPN and extracts the PPN, based on the correspondence in the FTL mapping table.

19. The memory system of claim 18, further comprising:
a cache temporarily storing the FTL map address generated by the FTL map address generator and the FTL mapping table received from the memory.

20. The memory system of claim 19, wherein in response to the CPU calling a same logical address more than once, the LPN translator provides the PPN of a subsequently received logical address by using the FTL mapping table stored in the cache, without accessing the memory.

* * * * *